(12) United States Patent
Ishii et al.

(10) Patent No.: US 7,873,381 B2
(45) Date of Patent: Jan. 18, 2011

(54) WIRELESS COMMUNICATION CONTROL SYSTEM, RADIO BASE STATION, AND WIRELESS COMMUNICATION CONTROL METHOD

(75) Inventors: Hiroyuki Ishii, Yokosuka (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 443 days.

(21) Appl. No.: 11/911,596

(22) PCT Filed: Apr. 12, 2006

(86) PCT No.: PCT/JP2006/307746

§ 371 (c)(1),
(2), (4) Date: Feb. 1, 2008

(87) PCT Pub. No.: WO2006/112328

PCT Pub. Date: Oct. 26, 2006

(65) Prior Publication Data

US 2008/0214226 A1    Sep. 4, 2008

(51) Int. Cl.
H04B 7/00 (2006.01)
H04Q 7/20 (2006.01)
(52) U.S. Cl. .................. 455/522; 455/69; 455/126; 455/515
(58) Field of Classification Search ................ 455/522, 455/453, 63.1, 574, 343.3, 343.1, 69, 452.2, 455/13.4, 515, 517, 126, 127.1; 370/335, 370/329, 316
See application file for complete search history.

(56) References Cited

U.S. PATENT DOCUMENTS

| 5,487,180 | A | 1/1996 | Ohtake |
| 5,883,887 | A * | 3/1999 | Take et al. ................... 370/329 |
| 2004/0202104 | A1 | 10/2004 | Ishii et al. |
| 2004/0266469 | A1* | 12/2004 | Hayashi et al. ............. 455/522 |
| 2006/0172758 | A1 | 8/2006 | Ishii et al. |
| 2009/0170549 | A1* | 7/2009 | Lee et al. .................... 455/522 |

FOREIGN PATENT DOCUMENTS

| EP | 1 494 371 A1 | 1/2005 |
| JP | 7-95151 | 4/1995 |
| JP | 2003-298508 | 10/2003 |
| JP | 2004-80530 | 3/2004 |
| JP | 2004-312530 | 11/2004 |
| WO | WO 03/036822 | 5/2003 |
| WO | WO 2004/019519 A1 | 3/2004 |

OTHER PUBLICATIONS

U.S. Appl. No. 11/911,607, filed Oct. 15, 2007, ISHII, et al.

* cited by examiner

*Primary Examiner*—John Lee
(74) *Attorney, Agent, or Firm*—Oblon, Spivak, McClelland, Maier & Neustadt, L.L.P.

(57) ABSTRACT

A radio communication control system (10) which controls a transmission power of a shared control channel for transmitting a control signal to a plurality of mobile stations, includes: a new transmission power setting section (13) configured to set a new transmission power of the shared control channel by adding an offset to a transmission power of a dedicated channel to be transmitted dedicatedly to each of the plurality of mobile stations; wherein the offset is set in accordance with a propagation environment of a radio communication.

5 Claims, 5 Drawing Sheets

FIG. 3

(a) REFERENCE TABLE (1)

| FADING FREQUENCY [Hz] | OFFSET VALUE [dB] |
|---|---|
| 0~30 | 7 |
| 30~60 | 9 |
| 60~100 | 11 |
| 100~ | 13 |

(b) REFERENCE TABLE (2)

| NUMBER OF PATHS | OFFSET VALUE [dB] |
|---|---|
| 1 | 11 |
| 2 | 9 |
| 3 | 8 |
| 4 OR MORE | 7 |

(c) REFERENCE TABLE (3)

| SIR [dB] | OFFSET VALUE [dB] |
|---|---|
| 0~7 | 9 |
| 7~14 | 9.5 |
| 14~21 | 10 |
| 21~ | 10.5 |

(d) REFERENCE TABLE (4)

| | | NUMBER OF PATHS | | |
|---|---|---|---|---|
| | | 1 | 2 | 3 OR MORE |
| FADING FREQUENCY [Hz] | 0~30 | 9 | 7 | 5 |
| | 30~60 | 11 | 9 | 9 |
| | 60~100 | 13 | 11 | 10 |
| | 100~ | 15 | 13 | 12 |

OFFSET VALUE [dB]

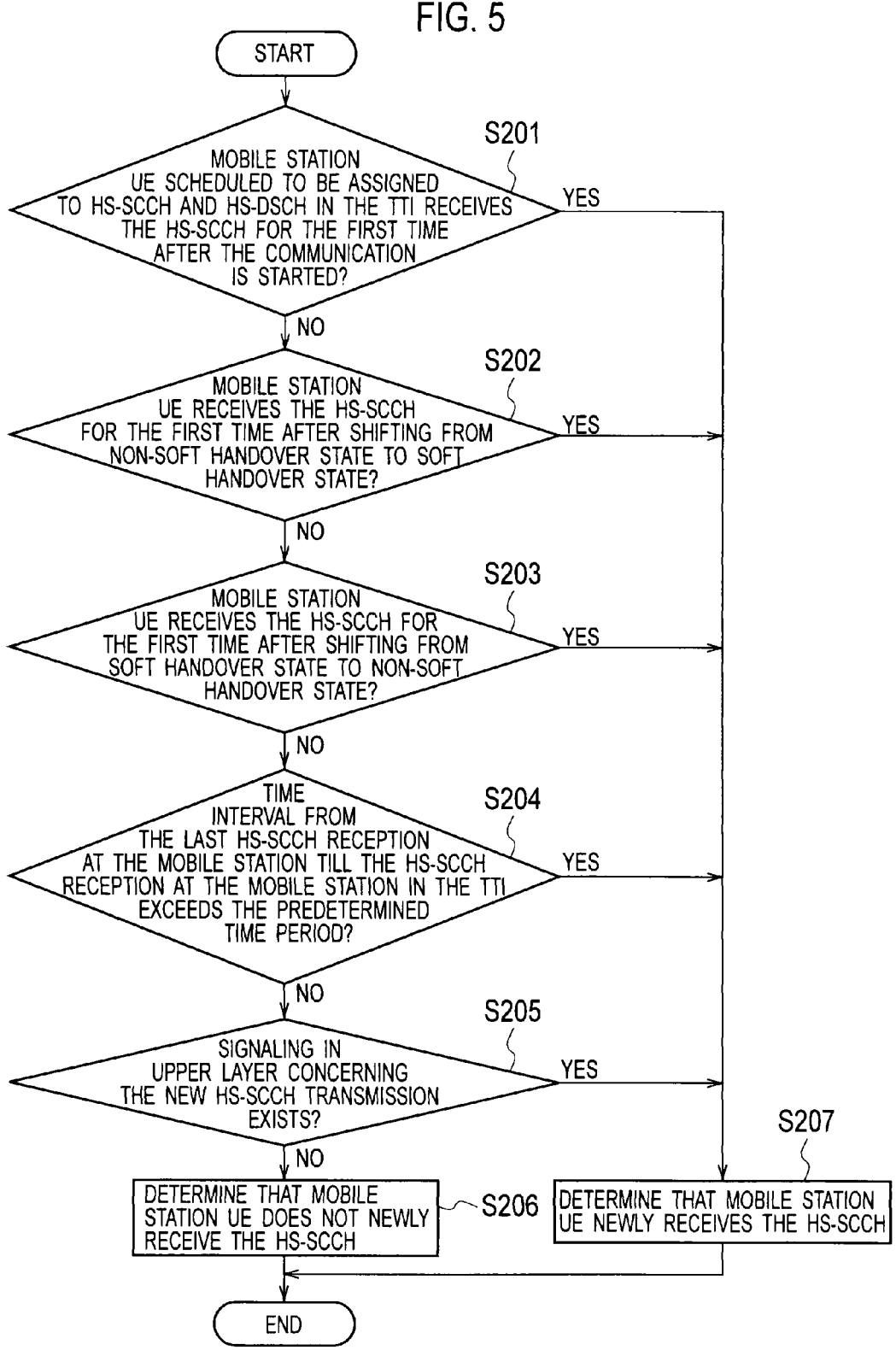

WIRELESS COMMUNICATION CONTROL SYSTEM, RADIO BASE STATION, AND WIRELESS COMMUNICATION CONTROL METHOD

TECHNICAL FIELD

The present invention relates to a radio communication control system, a radio base station and a radio communication control method.

BACKGROUND ART

Recently, an "HSDPA (High Speed Downlink Packet Access) system" has been specified as a radio communication control system (see, for example, "3rd Generation Partnership Project" on the Internet <http://3gpp.org>). The HSDPA system is a higher speed packet transmission system for a downlink transmission in IMT-2000. The HSDPA system has purposes of achieving a higher peak transmission rate, a lower transmission delay, and a higher throughput and the like.

The HSPDA system is a transmission system for performing communications by sharing one physical channel among a plurality of mobile stations in a time-division. The HSDPA system allocates a channel to a mobile station of better radio quality at each moment. Thus, it is possible to improve the throughput of the entire system.

In order to perform communications by sharing one physical channel among a plurality of mobile stations in a time-division as described above, the mobile stations to perform communication by using the physical channel in each TTI (Transmission Time Interval) must be notified. In the case of the HSDPA system, the notification is made to the plurality of mobile stations by using a shared control channel called HS-SCCH (High Speed-Shared Control Channel).

In this regard, disclosed is a method in which a radio base station sets a transmission power to be allocated to the HS-SCCH, by adding an offset to an A-DPCH (Associated-Dedicated Physical Channel). The A-DPCH is dedicatedly set to each of the mobile stations (see, for example, Japanese Patent Application Laid-open Publication No. 2004-312530). The Japanese Patent Application Laid-open Publication No. 2004-312530 describes that the offset value is controlled in accordance with a communication quality (e.g., a block error rate) of the HS-SCCH.

However, in the control method described in Japanese Patent Application Laid-open Publication No. 2004-312530, the communication quality of the HS-SCCH cannot be obtained when a communication is started since the communication is yet to be performed. Moreover, since the TTI length and an encoding method differ significantly between the HS-SCCH and the A-DPCH, there has been a problem that an optimal value for the offset varies according to a propagation environment of the radio communication, for example, a fading frequency, the number of paths or an SIR.

In view of the above-mentioned problems, an object of the present invention is to provide a radio communication control system, a radio base station, and a radio communication control method that makes it possible to set a suitable transmission power of the HS-SCCH even when the communication is started, by setting the offset value in accordance with the propagation environment of the radio communication.

DISCLOSURE OF THE INVENTION

In order to achieve the above object, a first aspect of the present invention is summarized as a radio communication control system which controls a transmission power of a shared control channel for transmitting a control signal to a plurality of mobile stations, including: a new transmission power setting section configured to set a new transmission power of the shared control channel by adding an offset to a transmission power of a dedicated channel to be transmitted dedicatedly to each of the plurality of mobile stations; wherein the offset is set in accordance with a propagation environment of a radio communication.

According to the radio communication control system of the first aspect of the invention, it is possible to set a suitable transmission power of the HS-SCCH even when the communication is started, by setting the offset value in accordance with the propagation environment of the radio communication.

In the first aspect of the invention, the new transmission power setting section may use, as the propagation environment of the radio communication, at least any one of a fading frequency of the propagation environment, a moving speed of each of the plurality of mobile stations, and a time correlation value of a channel estimation result in an uplink.

In the first aspect of the invention, the new transmission power setting section may use, as the propagation environment of the radio communication, at least any one of the number of paths in the propagation environment, an SIR in a downlink, and radio quality information notified from each of the plurality of mobile stations.

In the first aspect of the invention, the new transmission power setting section may use, as the propagation environment of the radio communication, whether or not each of the plurality of mobile stations is in a soft handover state.

In the first aspect of the invention, the new transmission power setting section may set the new transmission power of the shared control channel, any of when a communication is started, when a handover is started, when the handover is finished, or when a signaling from an upper layer is performed.

In the first aspect of the invention, the new transmission power setting section may set the new transmission power of the shared control channel when the shared control channel has not been transmitted for a predetermined time interval.

A second aspect of the present invention is summarized as a radio base station for controlling a transmission power of a shared control channel which transmits a control signal to a plurality of mobile stations, including: a new transmission power setting section configured to set a new transmission power of the shared control channel by adding an offset to a transmission power of a dedicated channel transmitted dedicatedly to each of the plurality of mobile stations, wherein the offset is set in accordance with a propagation environment of a radio communication.

According to the radio base station of the second aspect of the invention, it is possible to set a suitable transmission power of the HS-SCCH even when the communication is started, by setting the offset value in accordance with the propagation environment of the radio communication.

A third aspect of the present invention is summarized as a radio communication control method for controlling a transmission power of a shared control channel which transmits a control signal to a plurality of mobile stations, including: determining a new transmission power of the shared control channel by adding an offset to a transmission power of a dedicated channel transmitted dedicatedly to each of the plurality of mobile stations; wherein the offset is set in accordance with a propagation environment of a radio communication.

According to the radio communication control method of the third aspect of the invention, it is possible to set a suitable transmission power of the HS-SCCH even when the communication is started, by setting the offset value in accordance with the propagation environment of the radio communication.

BRIEF DESCRIPTION OF THE DRAWINGS

FIG. 3 FIG. 3 is an example of reference tables for calculating an offset value from the propagation environment in the radio communication control system according to the embodiment.

FIG. 5 FIG. 5 is a flowchart illustrating a radio communication control method according to the embodiment (Part 2).

BEST MODES FOR CARRYING OUT THE INVENTION

Figure 1:
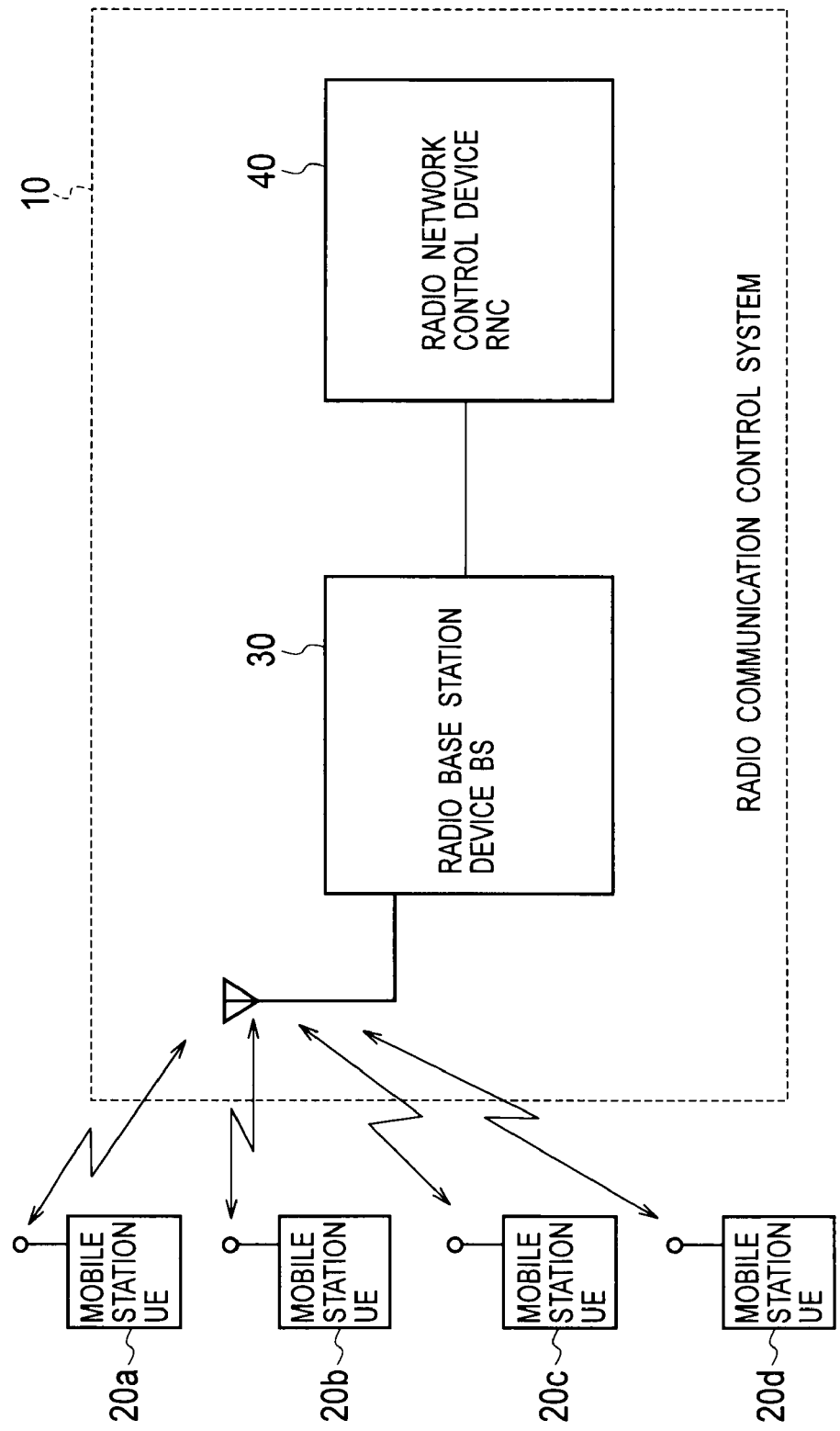
FIG. 1 FIG. 1 is a configuration diagram of an entire radio communication control system according to an embodiment.

Hereinafter, a description will be given of embodiments of the present invention with reference to the drawings. The same or similar reference numerals are given to the same or similar portions in the drawings below. Note that the drawings are expressed schematically.

(Configuration of Radio Communication Control System)

A description will be given of a configuration of a radio communication control system according to an embodiment of the present invention with reference to FIGS. 1 and 2.

A configuration diagram of an entire radio communication control system 10 according to the embodiment is shown in FIG. 1. As shown in FIG. 1, the radio communication control system 10 according to the embodiment is provided with a radio base station device BS30 wirelessly connected to a plurality of mobile stations UE20a, 20b, 20c and 20d, and a radio network control device RNC40 controlling the radio base station device BS30. Incidentally, the number of mobile stations performing radio communication with the radio base station device BS is set at "4" in the present embodiment, but may be other than "4".

In addition, although the description is given of the case where the radio communication control system includes the radio base station device BS30 and the radio network control device RNC40 in the embodiment, the present invention is not limited thereto. The present invention is also applicable to a case where the radio communication control system 10 includes only of the radio base station device BS30, or a case where the radio communication control system 10 includes only the radio network control device RNC40.

Furthermore, the radio communication control system 10 according to the embodiment controls a new transmission power of a shared control channel (hereinafter referred to as HS-SCCH) for transmitting control signals to the plurality of mobile stations UE20a, 20b, 20c and 20d, when the HSDPA system is applied in the IMT-2000 system which uses a W-CDMA system.

Here, the mobile stations UE20a, 20b, 20c and 20d are configured to perform radio communications with the base station BS30 by using the HSDPA system. Each mobile station reports a transmission power control command (TPC command) for controlling a transmission power of a dedicated channel (hereinafter referred to as A-DPCH) accompanying the HS-channels, to the base station BS30 by using an uplink.

Figure 2:
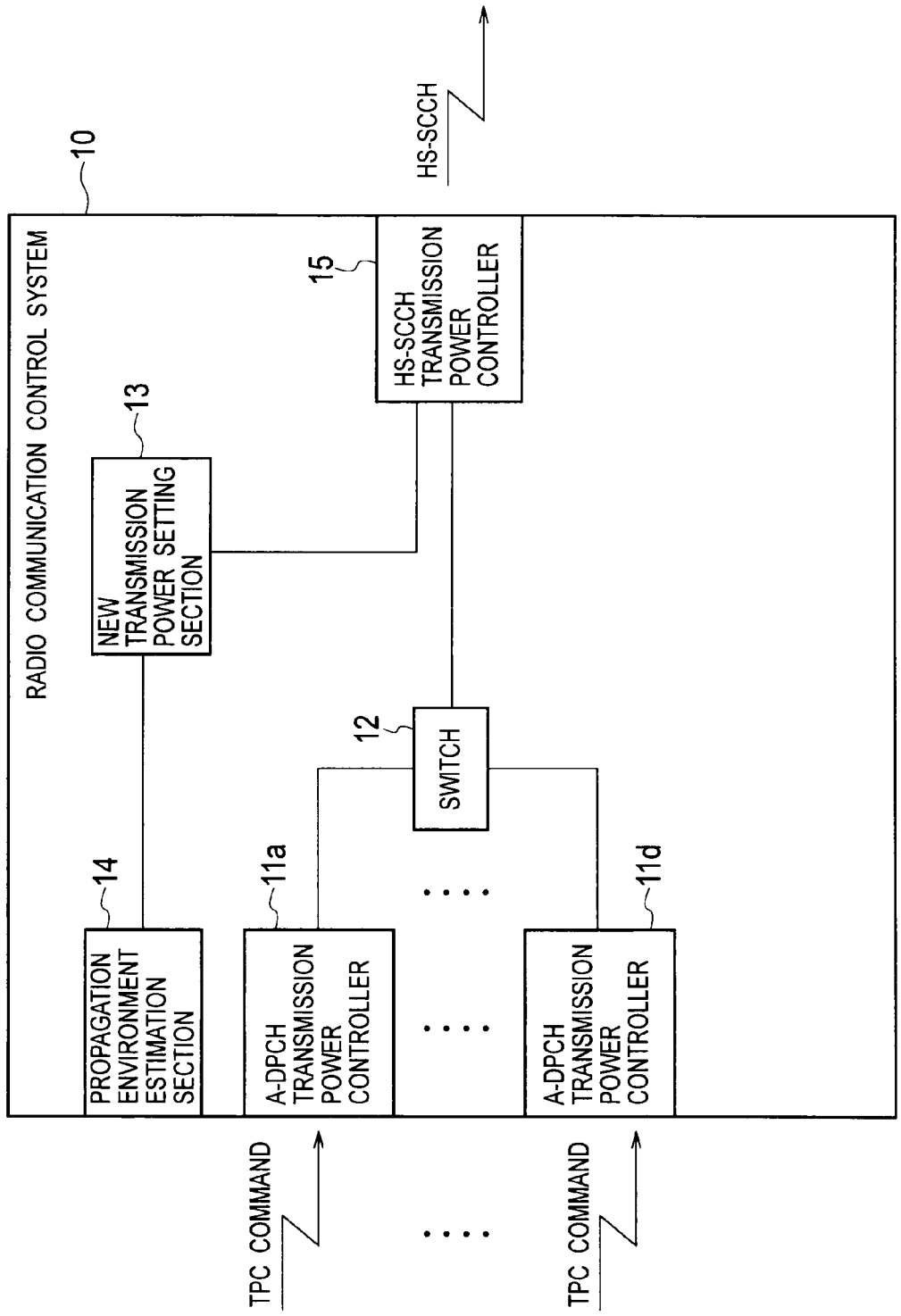
FIG. 2 FIG. 2 is a functional block diagram of the radio communication control system according to the embodiment.

As shown in FIG. 2, the radio communication control system 10 according to the embodiment is provided with a plurality of A-DPCH transmission power controllers 11a, 11b, 11c and 11d; a switch 12, a new transmission power setting section 13, a propagation environment estimation section 14, and an HS-SCCH transmission power controller 15. Incidentally, FIG. 2 only describes the sections for controlling and setting the transmission power of the HS-SCCH, in the radio communication control system 10.

The A-DPCH transmission power controllers 11a, 11b, 11c and 11d are provided for each of the mobile stations UE20a, 20b, 20c and 20d, respectively. The A-DPCH transmission power controllers 11a, 11b, 11c and 11d control the transmission power of the corresponding mobile station UE20a, 20b, 20c or 20d by using a transmission power control command transmitted from the corresponding mobile station UE20a, 20b, 20c or 20d, respectively.

In each TTI, the switch 12 is configured to transmit, to the HS-SCCH transmission power control unit 15, the transmission power of the A-DPCH of the mobile station UE, which is scheduled to be assigned to the HS-SCCH and the HS-PDSCH (or HS-DSCH, as a transport channel), together with identification information of the mobile station UE.

The new transmission power setting section 13 is configured to obtain propagation environment information in a downlink of the mobile station UE, which is scheduled to be assigned to the HS-SCCH and the HS-DSCH in the TTI, from the propagation environment estimation section 14. Here, the propagation environment information is such as a fading frequency, the number of paths, or an SIR. Thereafter, the new transmission power setting section 13 determines whether or not the mobile station UE newly receives the HS-SCCH. When the new transmission power setting section 13 determines that the mobile station UE newly receives the HS-SCCH, the new transmission power setting section 13 calculates an offset value to the transmission power of the A-DPCH in accordance with the propagation environment information so as to set the transmission power of the HS-SCCH. Then, the new transmission power setting section 13 transmits the calculated offset value to the HS-SCCH transmission power controller 15.

For example, when the new transmission power setting section 13 determines that the mobile station UE scheduled to be assigned to the HS-SCCH and the HS-DSCH in the TTI newly receives the HS-SCCH, the new transmission power setting section 13 may calculate the offset value in accordance with the fading frequency obtained from the propagation environment estimation section 14, for example, by using the Reference Table (1) as shown in FIG. 3. Then, the new transmission power setting section 13 may transmit the calculated offset value to the HS-SCCH transmission power controller 15. In a case where the fading frequency obtained from the propagation environment estimation section 14 is 50 Hz, for example, the new transmission power setting section 13 transmits, to the HS-SCCH transmission power controller 15, 9 dB as the offset value by referring to the Reference Table (1).

Alternatively, when the new transmission power setting section 13 determines that the mobile station UE scheduled to be assigned to the HS-SCCH and the HS-DSCH in the TTI newly receives the HS-SCCH, the new transmission power setting section 13 may calculate the offset value in accordance with the number of paths obtained from the propagation environment estimation section 14, for example, by using the Reference Table (2) as shown in FIG. 3. Then, the new transmission power setting section 13 may transmit the calculated offset value to the HS-SCCH transmission power controller 15. In a case where the number of paths obtained from the propagation environment estimation section 14 is 2, for example, the new transmission power setting section 13 transmits, to the HS-SCCH transmission power controller 15, 9 dB as the offset value by referring to the Reference Table (2).

When the new transmission power setting section 13 determines that the mobile station UE scheduled to be assigned to the HS-SCCH and the HS-DSCH in the TTI newly receives the HS-SCCH, the new transmission power setting section 13 may calculate the offset value in accordance with the SIR obtained from the propagation environment estimation section 14, for example, by using the Reference Table (3) as shown in FIG. 3. Then, the new transmission power setting section 13 may transmit the calculated offset value to the HS-SCCH transmission power controller 15. In a case where the SIR obtained from the propagation environment estimation section 14 is 10 dB, for example, the new transmission power setting section 13 transmits, to the HS-SCCH transmission power controller 15, 9.5 dB as the offset value by referring to the Reference Table (3).

Incidentally, although the offset value is calculated in accordance with one of the fading frequency, the number of the paths, and the SIR in the above examples, more than one of the fading frequency, the number of the paths, and the SIR may be used for calculating the offset value.

The Reference Table (4) in FIG. 3 shows a table for calculating the offset value by using the fading frequency and the number of the paths. In a case where the fading frequency is 15 Hz and the number of paths obtained from the propagation environment estimation section 14 is 2, for example, the new transmission power setting section 13 transmits, to the HS-SCCH transmission power controller 15, 7 dB as the offset value by referring to the Reference Table (4).

Alternatively, when the new transmission power setting section 13 determines that the mobile station UE scheduled to be assigned to the HS-SCCH and the HS-DSCH in the TTI newly receives the HS-SCCH, the new transmission power setting section 13 may calculate the offset value in accordance with whether or not the mobile station UE is in the soft handover state. Then, the new transmission power setting section 13 may transmit the offset value to the HS-SCCH transmission power controller 15. In this case, for example, each of the Reference Tables (1) to (4) shown in FIG. 3 has a set of the Reference Tables for the soft handover state and for the non-soft handover state, respectively. Then, based on whether the mobile station UE is in a soft handover state or not, the new transmission power setting section 13 refers to the corresponding Reference Table out of the set of the Reference Tables and sets the offset value.

An explanation will be given below of a reason for having the set of the reference tables for each of the soft handover state and for a non-soft handover state, respectively. When the mobile station is in the soft handover state, the A-DPCH, which is a dedicated channel, simultaneously communicates with a plurality of cells while the HS-SCCH performs communication with only a single cell. In this case, the transmission power of the A-DPCH is decreased according to a diversity effect resulting from the soft handover. Thus, the optimal value of the offset between the A-DPCH and the HS-SCCH in the soft handover state results in being different from that of the non-soft handover state. For the reasons above, each of the Reference Tables (1) to (4) has the set of the Reference Tables for the soft handover state and for the non-soft handover state, respectively.

In addition, when the new transmission power setting section 13 determines that the mobile station UE scheduled to be assigned to the HS-SCCH and the HS-DSCH in the TTI newly receives the HS-SCCH, for example, the new transmission power setting section 13 may always notify the HS-SCCH transmission power controller 15 of the same offset value, irrespective of the propagation environment information in the downlink of the mobile station UE.

A description will be given below of a determination method in which the new transmission power setting section 13 determines whether or not the mobile station UE scheduled to be assigned to the HS-SCCH and the HS-DSCH in the TTI newly receives the HS-SCCH.

For example, the new transmission power setting section 13 may determine that the mobile station UE newly receives the HS-SCCH, when the mobile station UE receives the HS-SCCH for the first time after the communication is started.

Alternatively, the new transmission power setting section 13 may determine that the mobile station UE newly receives the HS-SCCH, when the mobile station UE receives the HS-SCCH for the first time after shifting from the non-soft handover state to the soft handover state.

The new transmission power setting section 13 may also determine that the mobile station UE newly receives the HS-SCCH, when the mobile station UE receives the HS-SCCH for the first time after shifting from the soft handover state to the non-soft handover state.

Here, the A-DPCH performs communications with a plurality of cells in the soft handover state, while the HS-SCCH performs communicate with only a single cell even in the soft handover state. Thus, the optimal value for the offset possibly varies. Accordingly, when shifting between the soft handover state and the non-soft handover state, the communication by using a more optimal offset value can be performed by newly controlling the transmission power of the HS-SCCH.

The new transmission power setting section 13 may also determine that the mobile station UE newly receives the HS-SCCH, when a time interval between the last HS-SCCH reception at the mobile station UE and the HS-SCCH reception at the mobile station UE in the TTI exceeds a predetermined time interval. For example, when the predetermined time interval is 20 seconds, and the time interval from the HS-SCCH reception at the mobile station UE till the HS-SCCH reception at the mobile station UE in the TTI is 30 seconds, the new transmission power setting section 13 determines that the mobile station UE newly receives the HS-SCCH.

In addition, the new transmission power setting section 13 may determine that the mobile station UE newly receives the HS-SCCH in accordance with a signaling from the layer or a signaling from the node, for example. Specifically, the new transmission power setting section 13 determines that the mobile station UE newly receives the HS-SCCH when a radio network control device RNC performs a signaling to notify the radio base station device BS that the mobile station UE newly receives the HS-SCCH. Alternatively, the new transmission power setting section 13 determines that the mobile station UE newly receives the HS-SCCH when the radio network control device RNC performs the signaling to notify the radio base station device BS of the offset value for the mobile station UE.

Furthermore, the new transmission power setting section 13 may set a higher offset value so as to obtain a better quality than required. Thus, by setting an offset value higher than an original value as described above, a communication with a stable quality can be performed when the communication of the HS-SCCH is started.

The propagation environment estimation section 14 is configured to obtain the propagation environment information of the mobile station UE, the propagation environment information such as the fading frequency, the number of paths, or the SIR. Further, the propagation environment estimation section 14 is configured to notify the new transmission power control setting section 13 of the propagation environment information in the downlink.

Here, an example of a method for obtaining the fading frequency is described. The fading frequency can be estimated by using a time correlation value of a pilot signal in the uplink or a time correlation value of the estimated channel value obtained with the pilot signal, for example. Alternatively, for example, the mobile station may estimate its moving speed according to location information from a GPS, information from a vehicle in which the mobile station exists (a speed meter value), and the like, and notify, through the uplink, the radio base station of the estimated moving speed. Thereby, the fading frequency is estimated according to the moving speed notified from the mobile station.

Moreover, the number of the paths can be obtained by a path search performed by using a pilot signal in the uplink. The number of the paths may be a value obtained at a moment, or an average value obtained in a predetermined averaging period.

Furthermore, the SIR can be obtained, for example, by using a CQI (Channel Quality Indicator) transmitted from the mobile station UE by using the HS-DPCCH. The HS-DPCCH is an HSDPA control channel in the uplink. The SIR can be obtained by using the following conversion equation; Equation (1):

$$SIR = CQI - 3.5 \qquad \text{Equation (1)}$$

The HS-SCCH transmission power controller 15 controls the transmission power of the HS-SCCH in the TTI. The present invention relates to a case where the mobile station UE scheduled to be assigned to the HS-SCCH and the HS-DSCH in the TTI newly receives the HS-SCCH when the communication is started (i.e., in the TTI). Hence, a description will be given below of the function of the HS-SCCH transmission power controller 15 in which the mobile station UE newly receives the HS-SCCH. Therefore, descriptions of the functions other than this will be omitted.

When the mobile station UE scheduled to be assigned to the HS-SCCH and the HS-DSCH in the TTI newly receives the HS-SCCH, the HS-SCCH transmission power controller 15 obtains, from the new transmission power setting section 13, the offset value to the transmission power of the A-DPCH, so as to set the transmission power of the HS-SCCH. Thereafter, the HS-SCCH transmission power controller 15 sets the transmission power of the HS-SCCH in accordance with the transmission power of the A-DPCH and the offset value. More specifically, the HS-SCCH transmission power controller 15 set the transmission power of the HS-SCCH by using the following Equation (2);

$$(\text{transmission power of } HS\text{-}SCCH) = (\text{transmission power of } A\text{-}DPCH) + (\text{offset value}) \qquad \text{Equation (2)}$$

(Radio Communication Control Method)

Figure 4:
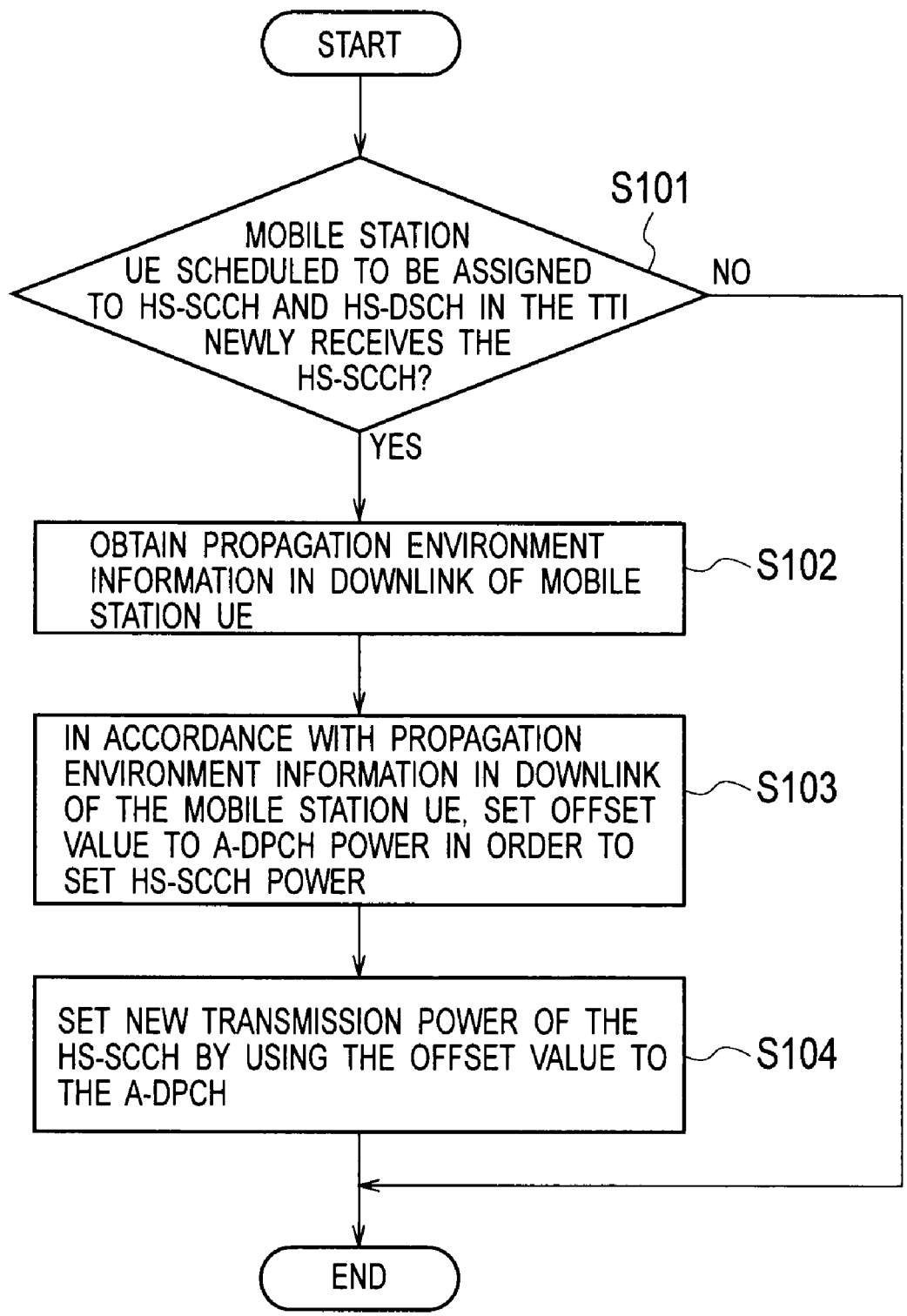
FIG. 4 FIG. 4 is a flowchart illustrating a radio communication control method according to the embodiment (Part 1).

Hereinafter, a description will be given of an operation of the radio communication control system 10 according to the present embodiment with reference to FIG. 4. FIG. 4 is a flowchart illustrating an example of an operation for controlling a new transmission power of the HS-SCCH in the HSDPA system, applied in the IMT-2000 system which uses the W-CDMA system.

In step S101, the new transmission power setting section 13 determines whether or not the mobile station UE scheduled to be assigned to the HS-SCCH and the HS-DSCH in the TTI newly receives the HS-SCCH. Then, when the mobile station UE is determined to newly receive the HS-SCCH, the processing advances to step S102. When the mobile station UE is determined not to newly receive the HS-SCCH, the new transmission power setting section 13 determines that setting the new transmission power of the HS-SCCH is not required, and terminates the processing.

Next, in step S102, the new transmission power setting section 13 obtains propagation environment information in the downlink of the mobile station UE, which is scheduled to be assigned to the HS-SCCH and the HS-DSCH in the TTI. Here, the propagation environment information in the downlink includes the fading frequency, the number of paths, the SIR and the like as described above.

Then, in step S103, the new transmission power setting section 13 sets the offset value to the transmission power of the A-DPCH in accordance with the propagation environment information in the downlink of the mobile station UE, so as to set the transmission power of the HS-SCCH.

Thereafter, in step S104, the new transmission power setting section 13 sets the new transmission power of the HS-SCCH in accordance with the offset value for the HS-SCCH and the transmission power of the A-DPCH.

It should be noted that the applicable range of the radio communication control system and the radio communication control method according to the present invention should not be limited to the HSDPA system, which is a high speed packet transmission system in the W-CDMA IMT-2000 system. The radio communication control system and the radio communication control method according to the present invention are also applicable to a high speed packet transmission system using a CDMA-TDD system, a CDMA2000 system, a 1xEV-DO system or the like.

With reference to the flowchart in FIG. 5, a description will be given of an operation of the new transmission power setting section 13 for determining whether or not the mobile station UE newly receives the HS-SCCH. It describes the behavior of the new transmission power setting section 13 in step S101 of FIG. 4.

First, in step S201, the new transmission power setting section 13 determines whether or not the mobile station UE scheduled to be assigned to the HS-SCCH and the HS-DSCH in the TTI receives the HS-SCCH for the first time after the communication is started. When the new transmission power setting section 13 determines that the mobile station UE receives the HS-SCCH for the first time, the processing advances to step S207. When the new transmission power setting section 13 determines the mobile station UE receives the HS-SCCH not for the first time, the processing advances to step S202.

Next, in step S202, the new transmission power setting section 13 determines whether or not the mobile station UE receives the HS-SCCH for the first time after shifting from the non-soft handover state to the soft handover state. When the new transmission power setting section 13 determines that the mobile station UE receives the HS-SCCH for the first time, the processing advances to step S207. When the new transmission power setting section 13 determines that the mobile station UE receives the HS-SCCH not for the first time, the processing advances to step S203.

Next, in step S203, the new transmission power setting section 13 determines whether or not the mobile station UE receives the HS-SCCH for the first time after the mobile station UE shifted from the soft handover state to the non-soft handover state. When the new transmission power setting section 13 determines that the mobile station UE receives the HS-SCCH for the first time, the processing advances to step S207. When the new transmission power setting section 13 determines that the mobile station UE receives the HS-SCCH not for the first time, the processing advances to step S204.

Next, in step S204, the new transmission power setting section 13 determines whether or not the time period from the last HS-SCCH reception at the mobile station UE till the HS-SCCH reception at the mobile station exceeds a predetermined time interval. When the new transmission power setting section 13 determines that the above-described time period exceeds the predetermined time interval, the processing advances to step S207. When the new transmission power setting section 13 determines that the above-described time period does not exceed the predetermined time interval, the processing advances to step S205.

Next, in step S205, the new transmission power setting section 13 determines whether or not the signaling in an upper layer relating to the new HS-SCCH transmission for the mobile station UE exists. When the new transmission power setting section 13 determines that the signaling exists, the processing advances to step S207. When the new transmission power setting section 13 determines that the signaling does not exist, the processing advances to step S206.

Next, in step S206, the new transmission power setting section 13 determines that the mobile station UE does not newly receive the HS-SCCH in the TTI.

In contrast, in step S207, the new transmission power setting section 13 determines that the mobile station UE newly receive the HS-SCCH in the TTI.

(Operations and Effects)

According to the radio communication control system 10 of the present embodiment, the offset value is set in accordance with the propagation environment of the radio communication. Thus, the transmission power of the shared control channel (HS-SCCH) can be set so that the mobile station can receive the HS-SCCH with the suitable communication quality when the mobile station newly receives the HS-SCCH. Consequently, it is possible to provide a stable communication quality from the beginning of the communication.

Further, the new transmission power of the HS-SCCH can be suitably set when the mobile station shifts between the soft handover state and the non-soft handover state, in addition to when the communication is started. Consequently, it is possible to provide a stable communication quality when the mobile station shifts between the soft handover state and the non-soft handover state.

In addition, the new transmission power setting section 13 of the radio communication control system 10 according to the embodiment may use, as the propagation environment of the radio communication, at least any one of the fading frequency of the propagation environment, the moving speed of the mobile station, and the time correlation value of the channel estimation result in the uplink. Consequently, it is possible to set a suitable transmission power of the HS-SCCH.

The new transmission power setting section 13 of the radio communication control system 10 according to the embodiment may also use, as the propagation environment of the radio communication, at least any one of the number of paths in the propagation environment, the SIR in the downlink, and the radio quality information (CQI) notified from the mobile station. Consequently, it is possible to set a suitable transmission power of the HS-SCCH.

Furthermore, the new transmission power setting section 13 of the radio communication control system 10 according to the embodiment may set the new transmission power of the shared control channel, any one of when the communication is started, when the handover is started, when the handover is finished, or when the signaling is performed from the upper layer. Consequently, the mobile station can receive the shared control channel (HS-SCCH) with a suitable communication quality, when the mobile station newly receives the HS-SCCH.

The new transmission power setting section 13 of the radio communication control system 10 according to the embodiment may also set the new transmission power of the shared control channel when the shared control channel has not been transmitted for the predetermined time interval. Therefore, the new transmission power setting section 13 can determine that the mobile station newly receives the HS-SCCH, when the predetermined time interval has passed.

OTHER EMBODIMENTS

Although the present invention has been described with the above embodiment, it is not to be understood that descriptions and drawings that constitute part of the present disclosure are intended to limit the invention. From this disclosure, various alternative embodiments, examples and operation techniques will be apparent to those skilled in the art.

For example, in FIG. 1, an explanation has been given of the radio communication control system 10 being configured of the radio base station device BS30 and the radio network control device RNC40. However, in FIG. 2, the respective constituent features (the A-DPCH transmission power controllers 11a, 11b, 11c and 11d, the switch 12, the new transmission power setting section 13, the propagation environment estimation section 14 and the HS-SCCH transmission power controller 15) maybe located in the radio base station device BS30. Similarly, the respective constituent features (the A-DPCH transmission power controllers 11a, 11b, 11c and 11d, the switch 12, the new transmission power setting section 13, the propagation environment estimation section 14 and the HS-SCCH transmission power controller 15) shown in FIG. 2 may be located in the radio network control device RNC40.

Thus, it is obvious that the present invention includes various embodiments and the like that are not described herein. Accordingly, the technical scope of the present invention is intended to be defined only by the claimed elements of the invention according to the scope of claims that is reasonably understood from the above descriptions.

INDUSTRIAL APPLICABILITY

As described above, the radio communication control system, the radio base station and the radio communication control method according to the present invention are useful for the techniques for setting a suitable transmission power of the HS-SCCH.

What is claimed is:

1. A radio communication control system which controls a transmission power of a shared control channel for transmitting a control signal to a plurality of mobile stations, comprising:

a new transmission power setting section configured to set a new transmission power of the shared control channel by adding an offset to a transmission power of a dedicated channel to be transmitted dedicatedly to each of the plurality of mobile stations; wherein the offset is set in accordance with a propagation environment of a radio communication, and the new transmission power setting section is configured to set the new transmission power of the shared control channel when the shared control channel has not been transmitted for a predetermined time interval.

2. The radio communication control system according to claim 1, wherein the new transmission power setting section is configured to use, as the propagation environment of the radio communication, at least any one of a fading frequency of the propagation environment, a moving speed of each of the plurality of mobile stations, and a time correlation value of a channel estimation result in an uplink.

3. The radio communication control system according to claim 1, wherein the new transmission power setting section is configured to use, as the propagation environment of the radio communication, at least any one of the number of paths in the propagation environment, an SIR in a downlink, and radio quality information notified from each of the plurality of mobile stations.

4. The radio communication control system according to claim 1, wherein the new transmission power setting section is configured to use, as the propagation environment of the radio communication, whether or not each of the plurality of mobile stations is in a soft handover state.

5. The radio communication control system according to claim 1, wherein the new transmission power setting section is further configured to set the new transmission power of the shared control channel, any of when a communication is started, when a handover is started, when the handover is finished, or when a signaling from an upper layer is performed.

* * * * *

UNITED STATES PATENT AND TRADEMARK OFFICE
CERTIFICATE OF CORRECTION

| | | |
|---|---|---|
| PATENT NO. | : 7,873,381 B2 | Page 1 of 1 |
| APPLICATION NO. | : 11/911596 | |
| DATED | : January 18, 2011 | |
| INVENTOR(S) | : Hiroyuki Ishii et al. | |

It is certified that error appears in the above-identified patent and that said Letters Patent is hereby corrected as shown below:

On the title page, Item (30), the Foreign Application Priority Data has been omitted. Item (30) should read:

-- (30)    Foreign Application Priority Data

Apr. 14, 2005    (JP) ............................ 2005-117400 --

Signed and Sealed this
Eighth Day of March, 2011

David J. Kappos
*Director of the United States Patent and Trademark Office*